US012505364B2

United States Patent
Chopra et al.

(10) Patent No.: US 12,505,364 B2
(45) Date of Patent: Dec. 23, 2025

(54) SYSTEMS AND METHODS FOR DETERMINING DATA CRITICALITY BASED ON CAUSAL EVALUATION

(71) Applicant: EMC IP Holding Company LLC, Hopkinton, MA (US)

(72) Inventors: Shelesh Chopra, Bangalore (IN); Rahul Deo Vishwakarma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1282 days.

(21) Appl. No.: 17/236,044

(22) Filed: Apr. 21, 2021

(65) Prior Publication Data
US 2022/0343198 A1    Oct. 27, 2022

(51) Int. Cl.
*G06N 7/01*       (2023.01)
*G06F 18/2135*    (2023.01)
*G06F 18/214*     (2023.01)
*G06N 5/04*       (2023.01)

(52) U.S. Cl.
CPC .......... *G06N 7/01* (2023.01); *G06F 18/2135* (2023.01); *G06F 18/214* (2023.01); *G06N 5/04* (2013.01)

(58) Field of Classification Search
CPC .......... G06N 7/01; G06N 5/04; G06N 20/00; G06N 5/045; G06F 18/2135; G06F 18/214; G06F 11/1461
See application file for complete search history.

(56) References Cited

U.S. PATENT DOCUMENTS

| | | | | |
|---|---|---|---|---|
| 9,274,898 | B2* | 3/2016 | Boldyrev | G06F 11/1458 |
| 9,954,883 | B2* | 4/2018 | Ahuja | H04L 63/1433 |
| 10,535,025 | B2* | 1/2020 | Smiley | G06Q 10/06315 |
| 11,372,705 | B1* | 6/2022 | Minarik | G06F 11/3447 |
| 2008/0046483 | A1* | 2/2008 | Lehr | G06F 11/1451 |
| 2018/0095816 | A1* | 4/2018 | Fang | G06F 11/079 |
| 2019/0332486 | A1* | 10/2019 | Aseev | G06F 16/907 |
| 2020/0073648 | A1* | 3/2020 | Ambre | G06F 8/65 |
| 2020/0410418 | A1* | 12/2020 | Martynov | G06F 16/122 |
| 2021/0304204 | A1* | 9/2021 | Ramesh | G06F 18/217 |
| 2022/0005041 | A1* | 1/2022 | Chang | G06F 18/24 |
| 2022/0138561 | A1* | 5/2022 | Prendki | G06N 3/08 |
| | | | | 706/12 |
| 2024/0103456 | A1* | 3/2024 | Joensuu | G05B 13/0265 |

OTHER PUBLICATIONS

Navdeep Gill, A Responsible Machine Learning Workflow with Focus on Interpretable Models, Post-hoc Explanation, and Discrimination Testing, 2020, 33 pages (Year: 2020).*
Park et al., "Data Classification and Sensitivity Estimation for Critical Asset Discovery", Jul. 2016 IBM, pp. 1-12.*

\* cited by examiner

*Primary Examiner* — Jennifer N Welch
(74) *Attorney, Agent, or Firm* — Chamberlain, Hrdlicka, White, Williams & Aughtry; Aly Z. Dossa

(57) ABSTRACT

Techniques described herein relate to methods and systems for determining data asset criticality. Such techniques may include making a first determination that a plurality of data asset attributes are part of a causal attribute set; calculating a SHapeley Additive explanation (SHAP) value for each of the plurality of data asset attributes in the causal attribute set; and performing a weighted mean calculation using the SHAP values for each of the plurality of data asset attributes and a corresponding attribute value for each of the plurality of data asset attributes of a data asset to obtain a criticality score for the data asset.

14 Claims, 5 Drawing Sheets

| Attribute | Attribute Value Options | Description | DAG Symbol |
|---|---|---|---|
| Encryption Status | (0, 1, 2, 3) | Disabled, Enabled (one-way, two-way, anonymous) | Z-4 |
| Key-Rotation Frequency | (7, 14, 30, 90) | Weekly, Bi-Weekly, Monthly, Quarterly | Z-2 |
| Data Size | Numeric (GB) | Gigabytes of data | X-4 |
| Location | (0, 1) | On-Premise, Cloud | Z-1 |
| Retention Lock | (0, 1-70) | No, Yes (1-70 years) | X-1 |
| Tenant Unit | (0, 1) | No, Yes | X-3 |
| Backup Schedule | (1, 7, 30) | Daily, Weekly, Monthly | X-2 |
| Read Frequency | (0-1000) | Number of times accessed per month | Z-3 |
| Compliance | (1-5) | GDPR, HIPPA, PCI DSS, SOX, CCPA | N/A |
| Data Category Value | (1-10) | Value derived from other attributes | Y |

Data Attribute Table 300

FIG. 3A

SYSTEMS AND METHODS FOR DETERMINING DATA CRITICALITY BASED ON CAUSAL EVALUATION

BACKGROUND

Entities (e.g., companies) often have data assets. It is often important to backup such data assets. Data assets may be backed up to different storage types (e.g., solid state drives, hard disk drives, tape storage, etc.). Data assets may also be backed up to different storage locations (e.g., local, within the same data center, in the cloud, in off-site archives, etc.). Data assets may also be encrypted, and the encryption key may be changed on a schedule. Backups of data assets may or may not be replicated. All of the aforementioned aspects of data backup may determine how robustly the data is backed up, how quickly it may be accessed, the cost of the backup scheme, etc. However, it is often difficult how to decide how to back up a given data asset. Therefore, it may be useful to determine a relative importance of data assets.

SUMMARY

In general, certain embodiments described herein relate to a method for determining data asset criticality. The method may include making a first determination that a plurality of data asset attributes are part of a causal attribute set; calculating a SHapeley Additive explanation (SHAP) value for each of the plurality of data asset attributes in the causal attribute set; and performing a weighted mean calculation using the SHAP values for each of the plurality of data asset attributes and a corresponding attribute value for each of the plurality of data asset attributes of a data asset to obtain a criticality score for the data asset.

In general, certain embodiments described herein relate to a non-transitory computer readable medium that includes computer readable program code, which when executed by a computer processor enables the computer processor to perform a method for determining data asset criticality. The method may include making a first determination that a plurality of data asset attributes are part of a causal attribute set; calculating a SHapeley Additive explanation (SHAP) value for each of the plurality of data asset attributes in the causal attribute set; and performing a weighted mean calculation using the SHAP values for each of the plurality of data asset attributes and a corresponding attribute value for each of the plurality of data asset attributes of a data asset to obtain a criticality score for the data asset.

In general, certain embodiments described herein relate to a system for determining data asset criticality. The system may include a data valuator, comprising a processor, memory, and a storage device. The data valuator may be operatively connected to a plurality of data assets. In one or more embodiments, the data valuator is configured to make a first determination that a plurality of data asset attributes are part of a causal attribute set; calculate a SHapeley Additive explanation (SHAP) value for each of the plurality of data asset attributes in the causal attribute set; and perform a weighted mean calculation using the SHAP values for each of the plurality of data asset attributes and a corresponding attribute value for each of the plurality of data asset attributes of a data asset to obtain a criticality score for the data asset.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3B show an example in accordance with one or more embodiments of the invention.

DETAILED DESCRIPTION

Figure 1:
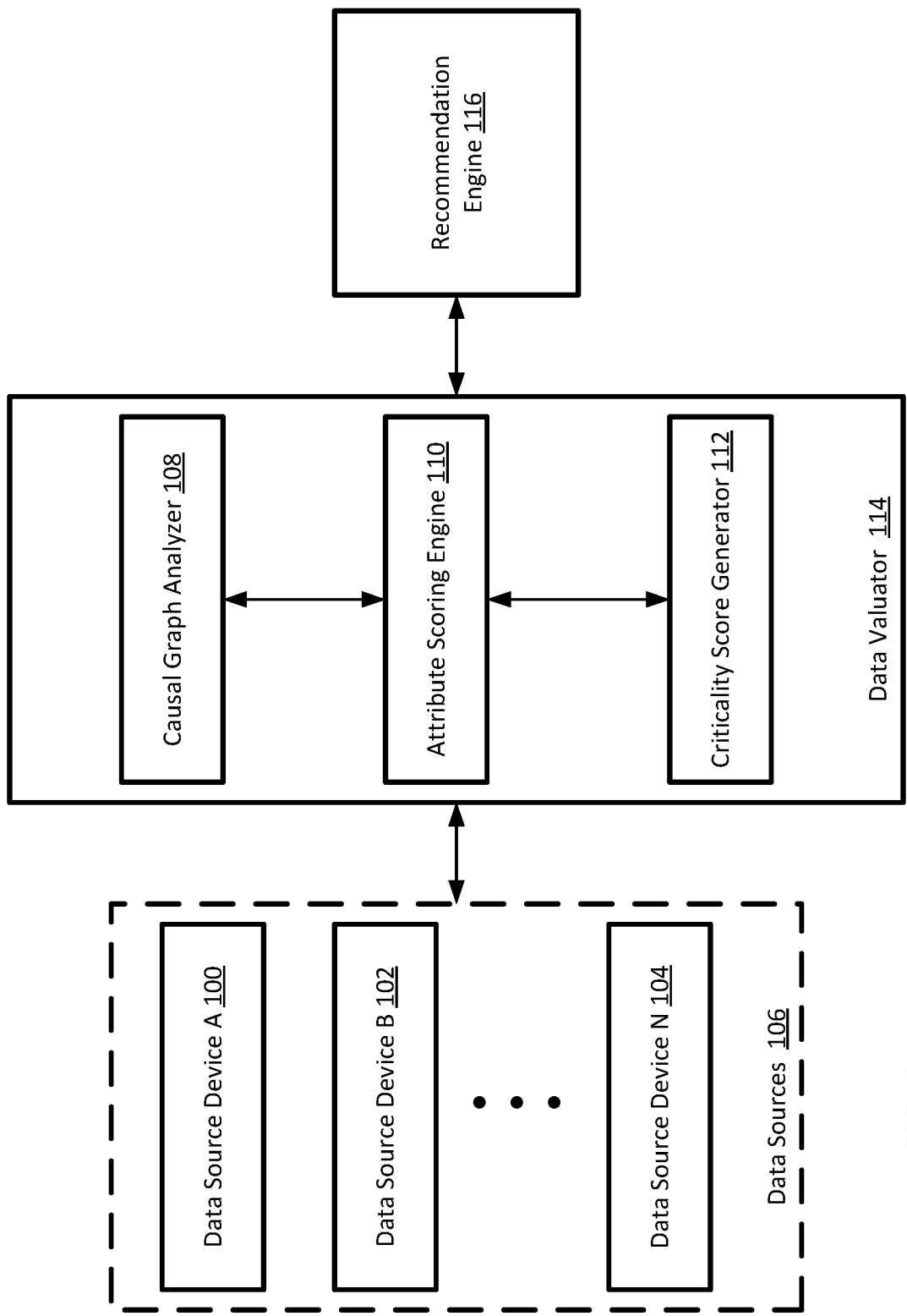
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for determining the relative criticality (i.e., importance) of data assets of a given entity (e.g., a company).

In one or more embodiments, the need for data management, monitoring and insightful action is indispensable in an era of exponential data growth. In one or more embodiments, understanding the criticality of data (i.e., relative importance of data assets) is an important factor for deciding on schemes for backing up said data, which may include, but are not limited to, what type of storage devices to back up a data asset to, the location of the backup storage devices used for backing up data assets, a replication strategy for backed up data assets, how often to rotate an encryption key for encrypted data asset backups, etc.

Accordingly, embodiments described herein relate to techniques for assigning a criticality score to data assets, classifying the data assets as low, medium, or high criticality based on the criticality score, and making recommendations regarding backup considerations based on the classification.

In one or more embodiments, data assets are monitored to observe and record information about the data assets. Such information may be any type of information relating to a data asset. Examples of such information include, but are not limited to: read frequency, write frequency, encryption status, encryption key rotation schedule, data asset size, data asset location, whether or not a backup of a data asset has a retention lock (and if so, for how long), whether or not a data asset is stored in a tenant unit within a given storage unit that may have multiple tenants, a current backup schedule for a data asset, how many and what types of standards a data asset needs to comply with, etc. In one or more embodiments, such information may be referred to as attributes of a data asset.

In one or more embodiments, an analyzer has access to a historical set of attribute values for any number of data assets. In one or more embodiments, the analyzer performs a statistical analysis (e.g., a linear regression analysis) to determine a numerical value for each data asset in the historical data set, which may be referred to as a data category value. In one or more embodiments, the numerical value is scaled to a value ranging from, for example, an integer from one to ten. In one or more embodiments, in such an analysis, data assets for which such an analysis results in the same value may be considered to be in the same category.

In one or more embodiments, attributes of a data asset may be organized (e.g., by an entity with knowledge of a given data domain) into a causal graph, such as, for example, a directed acyclic graph (DAG). In one or more embodiments, a causal graph of attributes of a given data asset may be provided to an attribute analyzer, which may perform a causal inference analysis to determine which of the attributes are important to the categorization of the data, using the scaled numerical categorization values from the analysis of the historical attribute values of the data assets, and the historical attribute values. In one or more embodiments, the causal inference analysis determines which attributes have an effect on the data categorization value. In one or more embodiments, those attributes that have little or no causal impact are disregarded, and those attributes that do have a causal impact are used for further analysis.

In one or more embodiments, the set of attributes having a causal impact on the data categorization may be referred to as a causal attribute set. In one or more embodiments, a SHapeley Additive explanation (SHAP) value is derived for each attribute in the causal attribute set. In one or more embodiments, the SHAP values are then scaled to be values between zero and one.

In one or more embodiments, the scaled SHAP values are then used in a weighted mean calculation of a criticality score for a given data asset. Specifically, in one or more embodiments, the scaled SHAP value for each attribute is multiplied by the attribute value for the data asset, and the results are summed, and divided by the sum of the SHAP values. In one or more embodiments, the result is the criticality score for the data asset.

In one or more embodiments, a ranking is created of each data asset for which a criticality score is calculated. In one or more embodiments, thresholds are set to classify the data assets as high, medium, or low criticality based on the criticality scores calculated for the data assets. In one or more embodiments, the ranked list and criticality classification is then presented to an entity for use in making decisions on how to back up the data assets. In one or more embodiments, the recommendations include, but are not limited to, such factors as what type of storage to back up a data asset to (e.g., active tier storage vs. tape archive), whether to back up the data asset locally or in the cloud, whether the backups should be replicated, how often encryption keys should be rotated, etc.

FIG. 1 shows a diagram of a system in accordance with one or more embodiments described herein. The system may include any number of data sources (106) (e.g., data source device A (100), data source device B (102), data source device N (106)). The system may also include a data valuator (114). The data valuator (114) may include a causal graph analyzer, an attribute scoring engine (110), and a criticality index generator (112). The system may also include a recommendation engine (116). Each of these components is described below.

In one or more embodiments, the data sources (106) are any computing devices generating or storing any data for any purpose. In one or more embodiments, data generated and/or stored by a data source (e.g., 100, 102, 104) may be referred to as a data asset. Examples of data assets include, but are not limited to, virtual machine (VM) data, logical container data, databases, file systems, etc. Any other collection of data may be considered a data asset without departing from the scope of embodiments described herein.

In one or more embodiments, a data source device (100, 102, 104) is a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a logical container (e.g., for one or more applications), and/or any other type of computing device with the aforementioned requirements.

In one or more embodiments, any or all of the aforementioned examples may be combined to create a system of such devices, which may collectively be referred to as a data source (100, 102, 104) (e.g., a set of blade servers in a blade server rack). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, each of the data sources (106) are operatively connected to a data valuator (114). In one or more embodiments, a data valuator (114) is a computing device (described above). In one or more embodiments, a data valuator (114) includes functionality to receive attributes of data assets from data sources (106) and to generate a relative criticality ranking of the data assets using calculated criticality scores for the data assets.

In one or more embodiments, the data valuator (114) includes a causal graph analyzer (108). In one or more embodiments, a causal graph analyzer (108) is any hardware (e.g., circuitry), software, firmware, or any combination thereof that includes functionality to use a historical data set of attributes of data assets to perform an analysis to determine a data categorization value for each data asset, and to scale the data categorization value to an integer between one and ten. For example, a linear regression analysis may be performed using attributes of data assets to derive a data categorization value. Any other type of statistical analysis and/or machine learning may be used to derive a data categorization value without departing from the scope of embodiments described herein.

In one or more embodiments, the causal graph analyzer also includes functionality to receive a causal graph (e.g., a DAG) of the various attributes, and to use the causal graph to, at least in part, perform a causal inference analysis to generate a causal attribute set. In one or more embodiments, a causal attribute set is a subset of the attributes of the data assets that have a causal effect on the data categorization value generated for the data assets as a result of the aforementioned linear regression analysis.

In one or more embodiments, the data valuator (114) includes an attribute scoring engine (110). In one or more embodiments, an attribute scoring engine (110) is any hardware (e.g., circuitry), software, firmware, or any combination thereof that includes functionality to receive a causal attribute set, and perform an analysis to calculate a SHAP score for the attributes in the attribute set. In one or more embodiments, the attribute scoring engine (110) also includes functionality to scale the SHAP values for each attribute in the causal attribute set to a value between zero and one.

In one or more embodiments, the data valuator (114) includes a criticality score generator (112). In one or more embodiments, an criticality score generator (112) is any hardware (e.g., circuitry), software, firmware, or any combination thereof that includes functionality to use the SHAP values for the attributes calculated by the attribute scoring engine to calculate a criticality score for a data asset having a set of attribute values. In one or more embodiments, the calculation uses the SHAP values in a weighted mean calculation, in which each SHAP value is multiplied by the value for the attribute for which the SHAP value was calculated, the results are summed, and that sum is divided by the sum of the SHAP values. In one or more embodiments, the result of the calculation is the criticality score for the data asset.

In one or more embodiments, the data valuator (114) is operatively connected to a recommendation engine (116). In one or more embodiments, the recommendation engine (116) is a computing device (described above). In one or more embodiments, the recommendation engine (116) includes functionality to receive criticality scores from the data valuator (114), and to organize the criticality scores into a ranked list of data assets and corresponding criticality scores. For example, the data assets may be arranged in descending order of criticality score. In one or more embodiments, the recommendation engine (116) also includes functionality to classify the data assets as high, medium, or low criticality based on at least two thresholds. For example, a data asset with a criticality score of 100 or more may be classified as high, a data asset with a criticality score of between 40 and 99 may be classified as medium, and a data asset with a criticality score of less than 40 may be classified as low. Any number of thresholds for classifying data assets into varying levels of criticality based on the criticality scores of the data assets may be used without departing from the scope of embodiments described herein.

In one or more embodiments, the recommendation engine (116) also includes functionality to make recommendations for the data assets based on the criticality classification. Such recommendations include, but are not limited to, what type of storage on which to back up the data asset (e.g., solid state drives, tape storage, etc.), where to back up the data asset (e.g., on premise, in cloud storage, etc.), whether and how much replication of the data asset backup should occur, how often the encryption key for the backup of the data asset should be rotated, etc.

In one or more embodiments, the recommendation engine (116) also includes functionality to provide the ranked criticality list of data assets, and the aforementioned recommendations to any interested entity, such as, for example, a data domain administrator.

In one or more embodiments, all or any portion of the devices shown in FIG. 1 may be operatively connected to any other device via a network. A network may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. For example, the recommendation engine may be part of the data valuator instead of a separate device. Accordingly, embodiments disclosed herein should not be limited to the configuration of components shown in FIG. 1.

Figure 2:
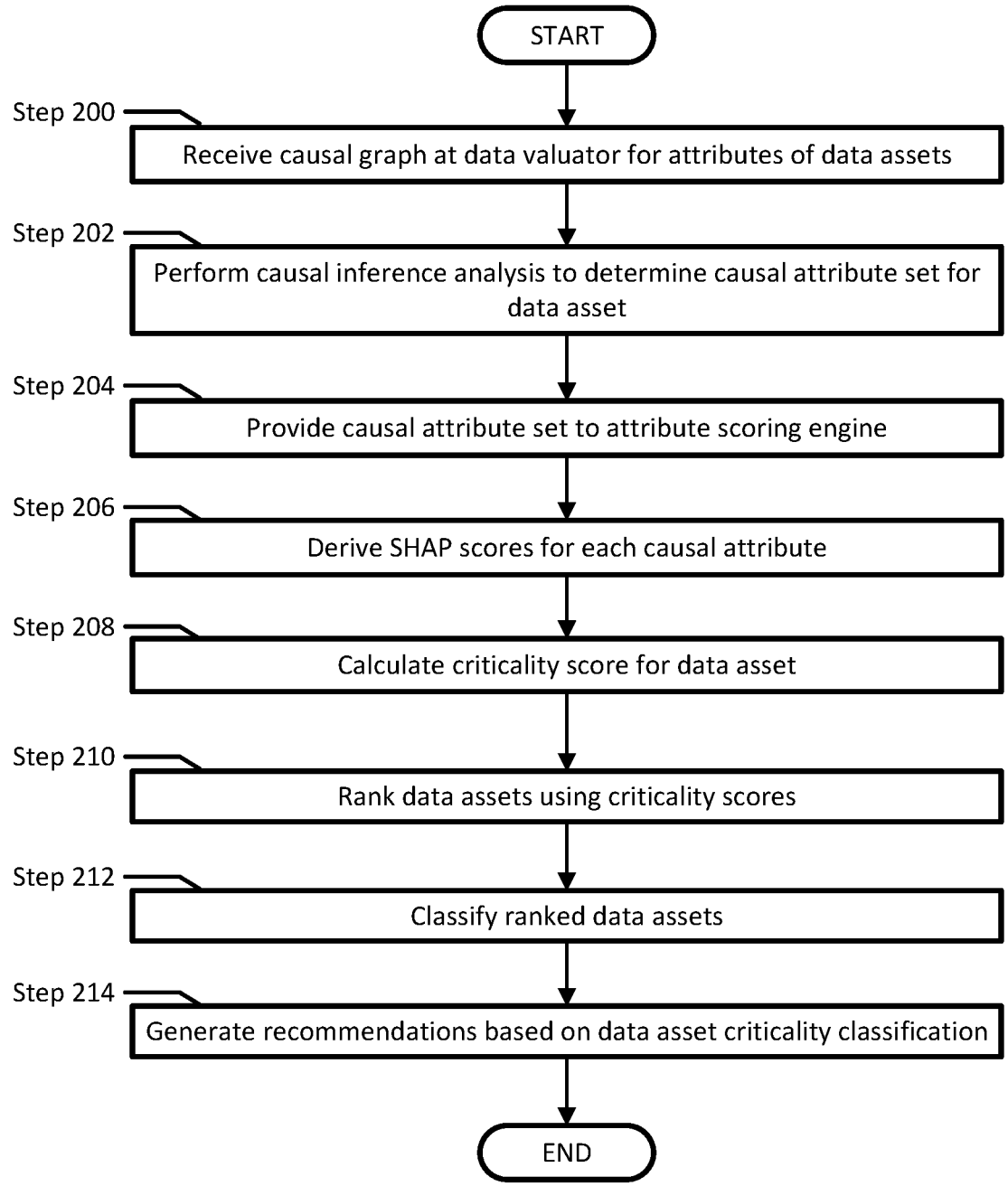
FIG. 2 shows a flowchart in accordance with one or more embodiments of the invention.

FIG. 2 shows a flowchart describing a method for calculating criticality scores for data assets in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Prior to Step 200, although not shown in FIG. 2, a historical data set of data asset attributes, having a set of attribute values for each of any number of data assets over any period of time, is used to perform a linear regression analysis to determine a data category value, scaled between one and ten, for each data asset in the historical data set. Other forms of statistical analysis may be used to determine a data category value for each data asset without departing from the scope of embodiments described herein.

In Step 200, a causal graph is received at a data valuator representing a causal relationship between attributes of data sets. In one or more embodiments, the causal graph may be in any form of data representation that conveys causal relationships between attributes in an attribute set of data assets. In one or more embodiments, the causal graph is received using any form of data transmission. For example, a data domain administrator with knowledge of the data assets of a data domain, and the attributes of such data assets, may create a DAG showing the causal relationship between the attributes, and the DAG may be transmitted over a network connection from a computing device of the administrator to a causal graph analyzer of a data valuator.

In Step 202, a causal inference analysis is performed using the causal graph, the historical data set, and data categorization values for the data assets to determine a causal attribute set. In one or more embodiments, the causal inference analysis is performed with respect to any one or more attributes, alone or in any combination, to determine whether the attributes have a causal impact on the data categorization value derived for a given data asset using a linear regression analysis (or any other relevant statistical analysis). In one or more embodiments, a causal attribute set is a subset of the attributes that have a causal effect on the data categorization value. Any portion of the attributes of data assets may be determined to have a causal impact on a data categorization value. In one or more embodiments, attributes that are determined by the causal inference analysis to have little or no impact on data categorization values for data assets are not included in a causal attribute set. As an example, a causal inference analysis of an attribute set that includes a read frequency attribute may determine that the causal effect of read frequency on a data categorization value is high with conditional parameter compliance on data value as compared to neglecting the conditional parameter. The same example attribute set may include data size, and the causal inference analysis determines that the size of data being protected has less causal impact as compared to the read frequency. In one or more embodiments, in a similar way, for each attribute, the causal impact of attributes on other attributes is calculated, and only the attributes which show high impact for the overall model are considered for data criticality score calculation (discussed below).

In Step 204, the causal attribute set is provided to an attribute scoring engine. In one or more embodiments, the causal attribute set may be provided to the attribute scoring engine using any scheme for sharing data between two entities. For example, the causal graph analyzer may determine the causal attribute set, and store the set in a storage or memory location accessible by the attribute scoring engine. As another example, the causal graph analyzer and the attribute scoring engine may be executing as processes, and the causal attribute set may be shared as part of an interprocess communication scheme.

In Step 206, a SHAP value is calculated for each attribute in the causal attribute set. In one or more embodiments, a SHAP value represents an allocation of relative credit to attributes of a data asset to the aforementioned data categorization value. In one or more embodiments, the SHAP values are mean values that represent the average impact of each attribute in the causal attribute set on the magnitude of the output of the linear regression analysis (i.e., the data category values).

In Step 208, the SHAP scores are used, along with the attribute values for a given data asset, to determine a criticality score for the data asset. In one or more embodiments, in the calculation, the SHAP values are scaled to between zero and one, and used in a weighted mean calculation. In one or more embodiments, for each attribute the scaled SHAP value is multiplied by the value of the attribute for the data asset. In one or more embodiments, the results of all such multiplications are added together. In one or more embodiments, the resulting value is divided by the sum of the SHAP values, and the result is the criticality score for the data asset. In one or more embodiments, the criticality score may be calculated as described above for any number of data assets.

In Step 210, the data assets are ranked based on their corresponding criticality scores. For example, the data asset having the highest criticality score may be ranked the highest, with each additional data asset being ranked in descending order after the data asset with the highest criticality asset. The ranked list of data assets may be organized in any manner suitable for representing a ranked list. In one or more embodiments, the ranked list of data assets is stored in storage of a data valuator.

In Step 212, the data assets are classified into any number of criticality classifications based on any number of relevant thresholds. For example, the data assets may be classified as high, medium, or low criticality depending on where the criticality score for the data asset falls relative to thresholds; below one threshold being low, above another threshold being high, and between the thresholds being medium.

In Step 214, recommendations are generated for each data asset based on the classifications assigned in Step 212. In one or more embodiments, any recommendation may be made relative to the backing up of data assets. As an example, recommendations may be made as to a data protection policy for an asset having a particular criticality classification, which may include data placement schemes (e.g., type of storage, location of storage), backup job scheduling, etc. As another example, a recommendation may be made regarding a replication strategy for the backup of a given data asset. As another example, a recommendation may be made as to how frequently to rotate an encryption key for the encryption of the backup of a data asset. Other recommendations relating to data asset backup strategies may be made without departing from the scope of embodiments described herein.

Although not shown in FIG. 2, data criticality scores for any number of data assets may be re-calculated on any schedule, as attribute values may change over time. Accordingly, embodiments described herein are not limited to performing any certain number of calculations of criticality scores, or to doing so for any particular number of data assets.

Figure 3B:
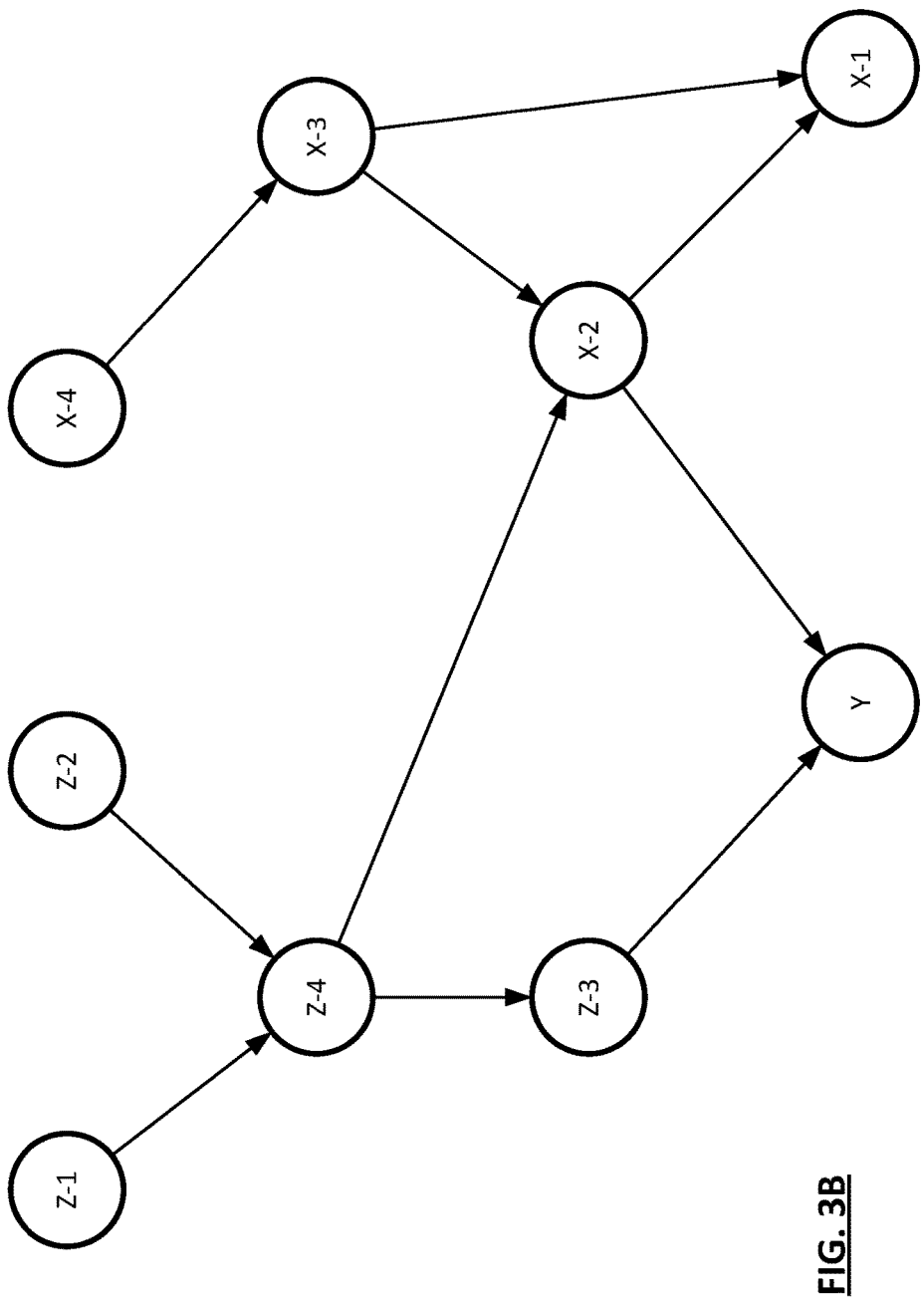

FIGS. 3A-3B show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrates concepts described herein.

Referring to FIG. 3A, consider a scenario in which data assets have attributes that include encryption status, key rotation frequency, data size, location, retention lock, tenant unit, backup schedule, read frequency, and compliance. Data attribute table (300) shows such attributes, the values they may take, a description of the values, and a DAG symbol (discussed further in the description of FIG. 3B), and a row for data category value.

The encryption status attribute may have a value of 0, 1, 2, or 3, representing that encryption is disabled, one-way, two-way, or anonymous, respectively, for a data asset. The key rotation frequency attribute may have a value of 7, 14, 30, or 90, representing a key rotation frequency of weekly, bi-weekly, monthly, or quarterly, respectively, for a data asset. The data size attribute may have a numerical value, representing a number of gigabytes of a data asset. The location attribute may have a value of 0 or 1, representing whether a data asset is stored on premise or in cloud storage, respectively. The retention lock attribute may have a value of 0 or an integer between 1 and 70, representing a no data retention lock, or a retention lock for a specified number of years, respectively, for a data asset. The tenant unit attribute may have a value of 0 or 1, with 0 representing that the data asset is not within a tenant unit portion of a storage unit, and 1 representing that the data asset is within a tenant unit of a storage unit. The backup schedule attribute may have a value of 1, 7, or 30, representing a backup frequency of daily, weekly, or monthly, respectively, for a data asset. The read frequency attribute may have a value of 0-1000, representing a number of times data from the data asset is read per month. The compliance attribute may have a value of 1, 2, 3, 4, or 5, representing that a data asset must be compliant with respect to the European Union's (EU's) General Data Protection Regulation (GDPR), the Health Insurance Portability and Accountability Act (HIPPA), the Payment Card Industry Data Security Standard (PCI DSS), the Sarbanes Oxley (SOX) Act, or the California Consumer Privacy Act (CCPA). The last row in data attribute table (300) is the data category value, which is a value derived from the other attribute values for a given data asset using a linear regression analysis, and is scaled to an integer value ranging from 1 to 10.

In one or more embodiments, a data valuator has access to a historical data set that has a number of data assets, and the corresponding attribute values for those data assets. The data value uses this historical data set to perform a linear regression analysis per data asset to calculate a result per data asset. The results are then scaled to be integer values ranging from 1 to 10, which serve as data categorization values for each data asset. Generally, the scaled data categorization values are labels, such that data assets for which analysis results in the same data categorization value may be considered to be similar in some way.

As shown in FIG. 3A, the encryption status attribute is assigned a DAG symbol of Z-4. The key rotation frequency attribute is assigned a DAG symbol of Z-2. The data size attribute is assigned a DAG symbol of X-4. The location attribute is assigned a DAG symbol of Z-1. The retention lock attribute is assigned a DAG symbol of X-1. The tenant unit attribute is assigned a DAG symbol of X-3. The backup schedule attribute is assigned a DAG symbol of X-2. The read frequency attribute is assigned a DAG symbol of Z-3. The compliance attribute is not assigned a DAG symbol. The data category value is assigned a DAG symbol of Y.

Such attributes have been organized by a domain administrator into a DAG.

The DAG (350) is shown in FIG. 3B. As shown in FIG. 3B, location and key rotation frequency have a causal relationship with encryption status. Data size has a causal relationship with tenant unit. Encryption status and tenant unit have a causal relationship with backup schedule. Encryption status also has a causal relationship with read frequency. Read frequency and backup schedule have a direct causal relationship with data category value. Backup schedule also has a causal relationship with retention lock.

The DAG (350) is used to determine a causal attribute set that includes encryption status, data size, location, retention lock, tenant unit, backup schedule, read frequency, and key retention frequency by performing a causal inference analysis of the attributes on the data category values calculated for the data assets in the historical set of data asset attributes. Thus, these attributes are provided to an attribute scoring engine for calculation of SHAP values for the attributes.

A SHAP value is derived for each of the attributes in the causal attribute set. The SHAP values are scaled to a value between zero and one, and used as a weight in a weighted mean calculation. The results are as follows:

| Attribute | Weight |
| --- | --- |
| Read Frequency | 0.22 |
| Encryption Status | 0.13 |
| Key Rotation Frequency | 0.14 |

-continued

| Attribute | Weight |
|---|---|
| Data Size | 0.34 |
| Location | 0.05 |
| Retention Lock | 0.32 |
| Tenant Unit | 0.07 |
| Backup Schedule | 0.16 |

The weighted mean calculation is performed using the following equation:

$$\text{criticality\_index} = [(0.22*\text{read\_frequency}) + (0.13*\text{encryption}) + (0.14*\text{key rotation frequency}) + (0.34*\text{data\_size}) + (0.05*\text{location}) + (0.32*\text{retention\_lock}) + (0.07*\text{tenant\_unit}) + (0.16*\text{backup\_schedule})] / (0.22 + 0.13 + 0.14 + 0.34 + 0.05 + 0.32 + 0.071 + 0.16).$$

Once the above equation has been established, it may be used to calculate a criticality score for data assets. For example, a given data asset has the following attribute values: read frequency=5; encryption=0; key rotation frequency=30; data size=10; location=1; retention lock=1; tenant unit=0; and backup schedule=7. The resulting data criticality score for the data asset is calculated as follows:

$$\text{crticality\_index} = ((0.22*5) + (0.13*0) + (0.14*30) + (0.34*10) + (0.05*1) + (0.32*1) + (0.07*0) + (0.16*7)) / (0.22 + 0.13 + 0.14 + 0.34 + 0.05 + 0.32 + 0.07 + 0.16) = \text{approximately } 7.169$$

Thus, 7.169 is the criticality score for that data asset.

As another example, a different data asset has the following attribute values: read_frequency=34; encryption=1; key_rotation_frequency=90; data_size=865; location=0; retention_lock=0; tenant_unit=1; and backup_schedule=30. The resulting data criticality score for the data asset is calculated as follows:

$$\text{crticality\_index} = ((0.22*34) + (0.13*1) + (0.14*90) + (0.34*865) + (0.05*0) + (0.32*0) + (0.07*1) + (0.16*30)) / (0.22 + 0.13 + 0.14 + 0.34 + 0.05 + 0.32 + 0.07 + 0.16) = \text{approximately } 224.77$$

Thus, 224.77 is the criticality score for that data asset.

Based on the above example data asset criticality score calculations, the first data asset may be assigned a classification of low criticality, as it is below a criticality score threshold of 20. As such, a recommendation may be made that the data asset should be backed up in an off-site tape archive storage, that the key rotation frequency should be decreased, and that no replication is necessary. The second data asset is assigned a classification of high criticality, as it has a criticality score that is greater than 100. As such, a recommendation may be made to store the backups in SSDs on premise, to increase the key rotation frequency, and to replicate the backup at least three times. Such recommendations may be made to an entity that owns the data assets.

Figure 4:
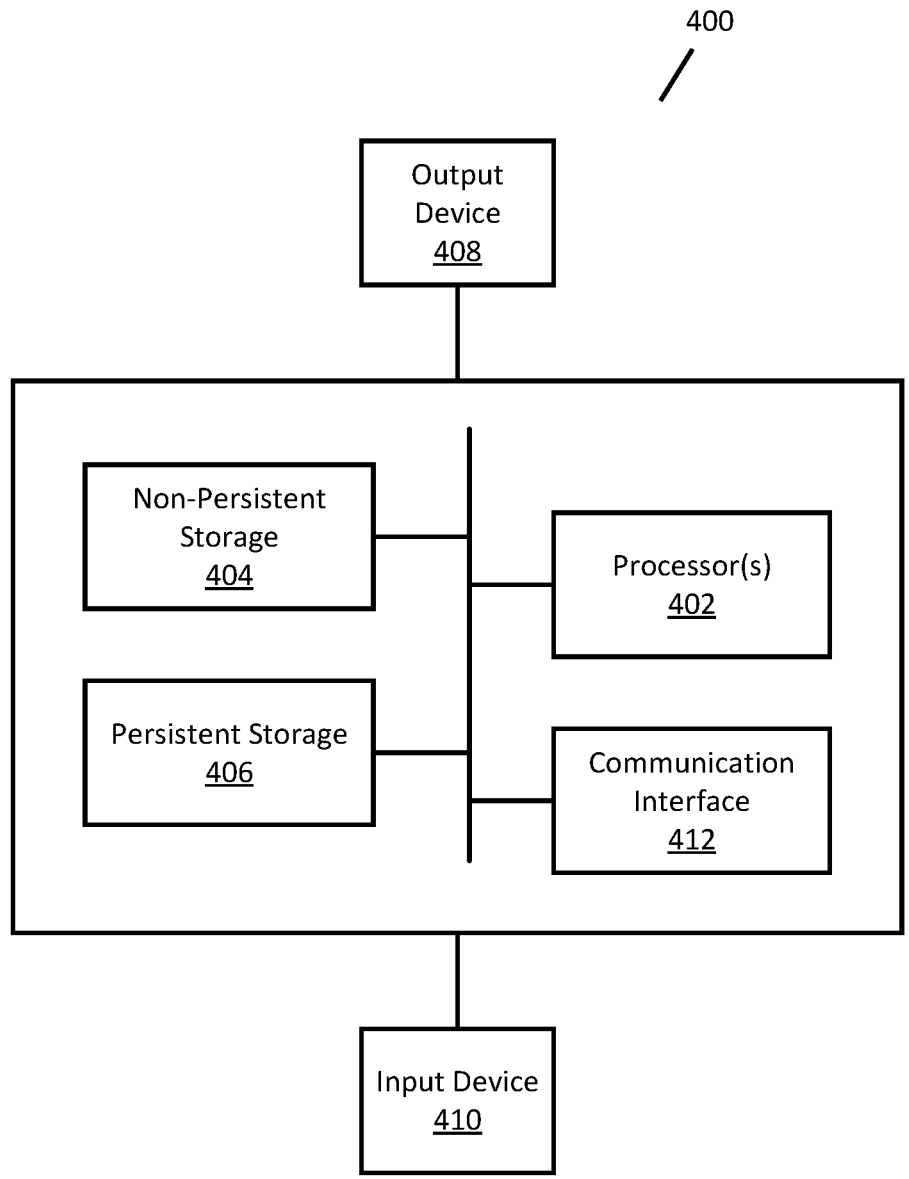
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein provide techniques for determining relative criticality of data assets using causal relationships and effects of attributes of data assets to determine attributes that have a causal effect on the valuation of a data asset. Such causal attributes are used to derive SHAP scores for the attributes, which, when converted to weights for the attributes, allow for calculation of a criticality score for data assets using the actual attribute values for the data assets. This causal model for determining relative criticality of data assets allows for ranking and classifying the data assets based on their respective criticality, which can be used to make recommendations to relative entities regarding various aspects of backup schemes to use for the data assets.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for determining data asset criticality, the method comprising:
   making a first determination that a plurality of data asset attributes are part of a causal attribute set;
   calculating a SHapley Additive explanation (SHAP) value for each of the plurality of data asset attributes in the causal attribute set;
   performing a weighted mean calculation using the SHAP values for each of the plurality of data asset attributes and a corresponding attribute value for each of the plurality of data asset attributes of a data asset to obtain a criticality score for the data asset;

including the data asset in a ranking of data assets using the criticality score; and classifying the data asset into a criticality classification based on a criticality threshold;

generating a backup recommendation set based on the criticality classification,
  wherein the backup recommendation set comprises backup actions comprising at least one selected from a group consisting of a key rotation frequency adjustment, a backup retention adjustment, a backup storage type adjustment, and a backup storage location adjustment; and adjusting an attribute of the data asset to include a backup action of the backup actions.

2. The method of claim 1, wherein making the first determination that the plurality of data asset attributes are part of the causal attribute set comprises:
  performing a data category value calculation using a historical attribute set of a plurality of data assets to obtain a plurality of data category values for a plurality of data assets; and
  performing a causal inference analysis using the historical attribute set, a causal graph, and the plurality of data category values to obtain the causal attribute set.

3. The method of claim 2, wherein the data category value calculation comprises a linear regression analysis.

4. The method of claim 2, wherein the causal graph is a directed acyclic graph (DAG).

5. The method of claim 1, wherein, before the weighted mean calculation, the SHAP values are scaled to values between zero and one.

6. A non-transitory computer readable medium comprising computer readable program code, which when executed by a computer processor enables the computer processor to perform a method for determining data asset criticality, the method comprising:
  making a first determination that a plurality of data asset attributes are part of a causal attribute set;
  calculating a SHapley Additive explanation (SHAP) value for each of the plurality of data asset attributes in the causal attribute set; and
  performing a weighted mean calculation using the SHAP values for each of the plurality of data asset attributes and a corresponding attribute value for each of the plurality of data asset attributes of a data asset to obtain a criticality score for the data asset;
  including the data asset in a ranking of data assets using the criticality score; and
  classifying the data asset into a criticality classification based on a criticality threshold;
  generating a backup recommendation set based on the criticality classification,
    wherein the backup recommendation set comprises backup actions comprising at least one selected from a group consisting of a key rotation frequency adjustment, a backup retention adjustment, a backup storage type adjustment, and a backup storage location adjustment; and
  adjusting an attribute of the data asset to include a backup action of the backup actions.

7. The non-transitory computer readable medium of claim 6, wherein making the first determination that the plurality of data asset attributes are part of the causal attribute set comprises:
  performing a data category value calculation using a historical attribute set of a plurality of data assets to obtain a plurality of data category values for a plurality of data assets; and
  performing a causal inference analysis using the historical attribute set, a causal graph, and the plurality of data category values to obtain the causal attribute set.

8. The non-transitory computer readable medium of claim 7, wherein the data category value calculation comprises a linear regression analysis.

9. The non-transitory computer readable medium of claim 7, wherein the causal graph is a directed acyclic graph (DAG).

10. The non-transitory computer readable medium of claim 6, wherein, before the weighted mean calculation, the SHAP values are scaled to values between zero and one.

11. A system for determining data asset criticality, the system comprising:
  a data valuator, comprising a processor, memory, and a storage device, operatively connected to a plurality of data assets, and configured to:
  make a first determination that a plurality of data asset attributes are part of a causal attribute set;
  calculate a SHapley Additive explanation (SHAP) value for each of the plurality of data asset attributes in the causal attribute set; and
  perform a weighted mean calculation using the SHAP values for each of the plurality of data asset attributes and a corresponding attribute value for each of the plurality of data asset attributes of a data asset to obtain a criticality score for the data asset;
  include the data asset in a ranking of data assets using the criticality score; and
  classify the data asset into a criticality classification based on a criticality threshold;
  generate a backup recommendation set based on the criticality classification,
    wherein the backup recommendation set comprises backup actions comprising at least one selected from a group consisting of a key rotation frequency adjustment, a backup retention adjustment, a backup storage type adjustment, and a backup storage location adjustment; and
  adjust an attribute of the data asset to include a backup action of the backup actions.

12. The system of claim 11, wherein, to make the first determination that the plurality of data asset attributes are part of the causal attribute set, the data valuator is further configured to:
  perform a data category value calculation using a historical attribute set of a plurality of data assets to obtain a plurality of data category values for a plurality of data assets; and
  perform a causal inference analysis using the historical attribute set, a causal graph, and the plurality of data category values to obtain the causal attribute set.

13. The system of claim 12, wherein the data category value calculation comprises a linear regression analysis, and the causal graph is a directed acyclic graph (DAG).

14. The system of claim 11, wherein, before the weighted mean calculation, the SHAP values are scaled to values between zero and one.

* * * * *